(12) United States Patent
Chen

(10) Patent No.: US 11,577,156 B1
(45) Date of Patent: Feb. 14, 2023

(54) DANCE BLANKET

(71) Applicant: SHENZHENSHI LUTEJIACHENG NETWORK TECHNOLOGY CO., LTD., Shenzhen (CN)

(72) Inventor: Yiting Chen, Shenzhen (CN)

(73) Assignee: SHENZHENSHI LUTEJIACHENG NETWORK TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/875,515

(22) Filed: Jul. 28, 2022

(30) Foreign Application Priority Data

Jun. 13, 2022 (CN) .......................... 202221483207.5

(51) Int. Cl.
*A63F 13/214* (2014.01)
*A63F 13/814* (2014.01)
*A63F 13/23* (2014.01)

(52) U.S. Cl.
CPC ............ *A63F 13/214* (2014.09); *A63F 13/23* (2014.09); *A63F 13/814* (2014.09); *A63F 2300/1068* (2013.01); *A63F 2300/8047* (2013.01)

(58) Field of Classification Search
CPC ....... A63F 13/214; A63F 13/23; A63F 13/814
See application file for complete search history.

(56) References Cited

U.S. PATENT DOCUMENTS

| 8,162,754 | B2 * | 4/2012 | Asami ................... | A63F 13/218 463/43 |
| 2001/0005692 | A1 * | 6/2001 | Song ..................... | A63F 13/214 463/43 |
| 2005/0153265 | A1 * | 7/2005 | Kavana .................. | G10H 1/368 434/250 |
| 2010/0285925 | A1 | 11/2010 | Pierce et al. | |
| 2015/0168628 | A1 | 6/2015 | Niu | |

FOREIGN PATENT DOCUMENTS

CN 210728644 U 6/2020

* cited by examiner

*Primary Examiner* — James S. McClellan
(74) *Attorney, Agent, or Firm* — Li & Cai Intellectual Property (USA) Office

(57) ABSTRACT

A dance blanket relates to the technical field of dance blankets, comprising: a blanket body and a main control box detachably assembled on the blanket body; wherein the main control box comprises: a housing, a processor built into the housing, a music playback module built into the housing and electrically connected to the processor, a power supply module built into the housing and electrically connected to the processor, and a sound outlet hole provided on the housing and corresponding to an outside of the music playback module; and wherein the blanket body has a secondary control box built into the blanket body, and the secondary control box is provided with a data line for connecting with a data line interface on the main control box; or the main control box is provided with a data line used for connecting to the data line interface on the secondary control box.

9 Claims, 4 Drawing Sheets

DANCE BLANKET

FIELD OF THE DISCLOSURE

The present disclosure relates to the technical field of dance blankets, in particular, to a dance blanket.

BACKGROUND OF THE DISCLOSURE

The dance blanket is an aerobic exercise. Since it is carried out indoors, it is not limited by weather and time, so it is suitable for indoor exercise. The dance blanket is very simple to play. When the game starts, the player listens to the music and looks at the bottom of the screen. Up, down, left and right arrows will appear continuously. As long as the arrow moves to the position that overlaps with the top arrow box, the player can step on the corresponding pedal with their feet.

For example, if the arrow points to the left, step on the left pedal, and so on to jump. If you step on the pedal and the arrow prompt is different, the word MISS will appear on the screen. If you enter the command correctly, you can get the word "perfect".

However, the existing dance blanket body and the control box are integrally designed and cannot be detached, the control box cannot be used independently, and the dance blanket occupies a large space after storage, which is inconvenient for packaging and carrying, and is in urgent need of improvement.

SUMMARY OF THE DISCLOSURE

The purpose of the present disclosure is to aim at the defects and deficiencies of the prior art, and provide a dance blanket, of which the blanket body and the main control box can be detached, and the main control can be used independently after disassembly, the blanket body is convenient to fold, occupies less space, and is easy to pack and carry.

For achieving the above object, the technical solution adopted by the present disclosure is to provide a dance blanket, comprising: a blanket body and a main control box detachably assembled on the blanket body; wherein the main control box comprises: a housing, a processor built into the housing, a music playback module built into the housing and electrically connected to the processor, a power supply module built into the housing and electrically connected to the processor, and a sound outlet hole provided on the housing and corresponding to an outside of the music playback module; and wherein the blanket body has a secondary control box built into the blanket body, and the secondary control box is provided with a data line for connecting with a data line interface on the main control box; or the main control box is provided with a data line used for connecting to the data line interface on the secondary control box.

In preferred embodiments, the housing is provided with a mounting strip, the blanket body is provided with a hook and loop fastener, and when assembling, one end of the hook and loop fastener bypasses the mounting strip and is pasted on another end of the hook and loop fastener to achieve self-adhesion.

In preferred embodiments, the housing is provided with at least one mounting hole, the mounting strip is arranged in a middle of the mounting hole, so as to divide the mounting hole into two halves.

In preferred embodiments, a number of the mounting holes is two and the two mounting holes are symmetrically arranged on a front side of the housing and the mounting strip is provided in a middle of each of the two mounting holes.

In preferred embodiments, when the data line interface is arranged on the main control box, a lower side of the housing is provided with a data line placement slot that penetrates to a front side of the housing, and the data line interface is arranged inside the data line placement slot.

In preferred embodiments, a limit slot is provided on a part of the front side of the housing corresponding to the data line placement slot, and only for a line part of the data line to pass through.

In preferred embodiments, a plurality of function buttons are arranged on the housing.

In preferred embodiments, the blanket body is provided with a first magnetic attraction device, and the housing of the main control box is provided with a second magnetic attraction device, and the blanket body is detachably assembled on the main control box through a cooperation of the first magnetic attraction device and the second magnetic attraction device.

In preferred embodiments, different parts of the blanket body are provided with a plurality of dancing and stepping areas, and each of the plurality of dancing and stepping areas is provided with a stepping sensor electrically connected to the secondary control box.

In preferred embodiments, the blanket body is made of a flexible material.

In the present disclosure, the main control box and the blanket body are designed to be detachable and separated. On the one hand, the main control box can be used independently as a music player to enhance entertainment; on the other hand, it is convenient to fold the blanket body after disassembly, saving space, and is more conducive to packaging and carrying.

BRIEF DESCRIPTION OF THE DRAWINGS

In order to more clearly illustrate the embodiments of the present disclosure 1 or the technical solutions in the prior art, the following briefly introduces the accompanying drawings that need to be used in the description of the embodiments or the prior art. Obviously, the accompanying drawings in the following description are just some embodiments of the present disclosure, and for those of ordinary skill in the art, other drawings can also be obtained from these drawings without any creative effort.

Figure 1:
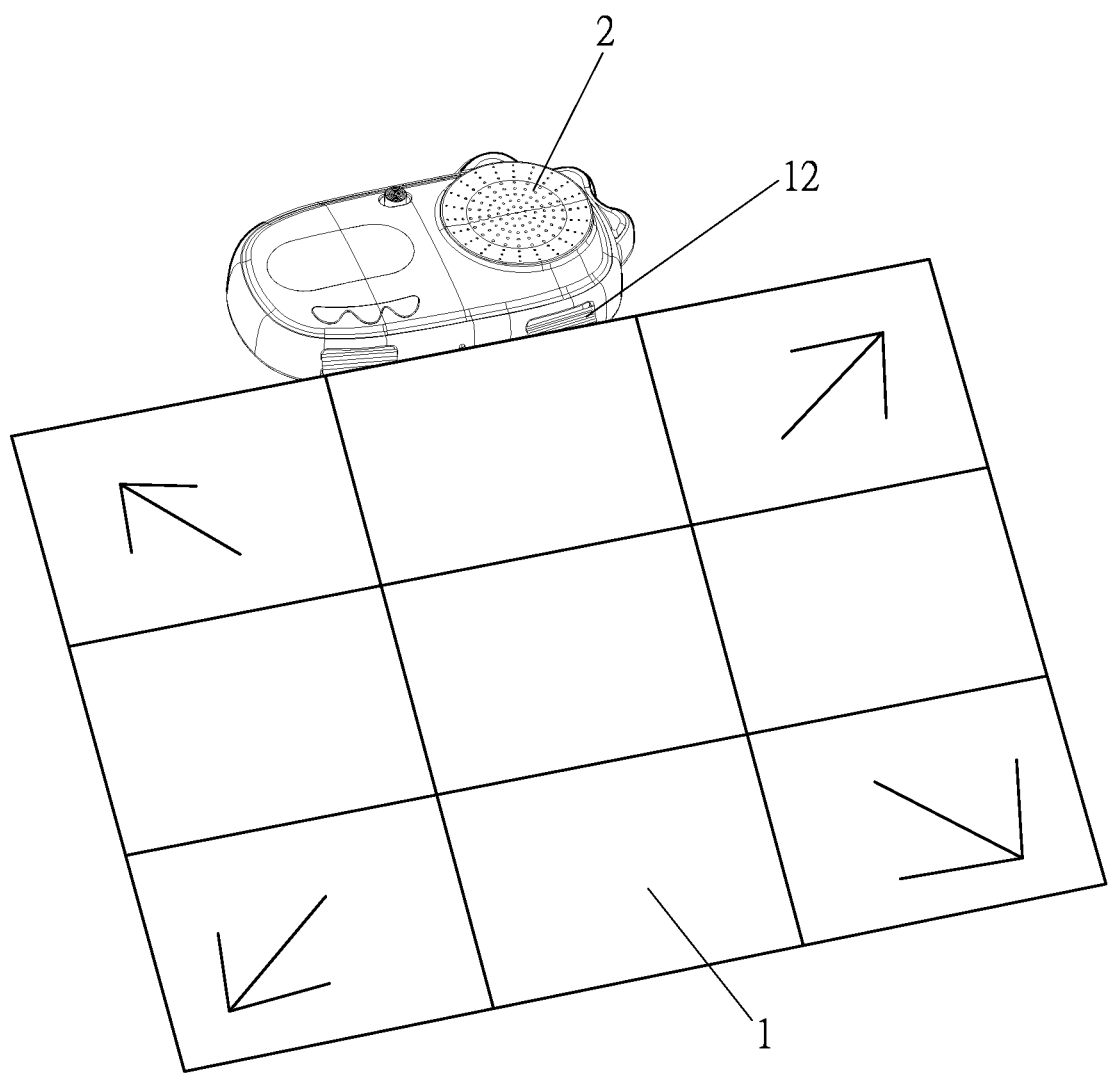
FIG. 1 is a structural diagram of the present disclosure.

Reference numeral: 1. blanket body; 11. secondary control box; 12. hook and loop fastener; 13. stepping sensor; 2. main control box; 21. housing; 22. processor; 23. music playback module; 24. power supply module; 211. sound hole; 212, data line interface; 213. mounting strip; 214. mounting hole; 215. data line placement slot; 216. limit slot; 217. function button.

DETAILED DESCRIPTION OF THE EXEMPLARY EMBODIMENTS

The present disclosure will be described in further detail below in conjunction with the accompanying drawings.

This specific embodiment is only an explanation of the present disclosure, and it is not a limitation of the present disclosure. Those skilled in the art can make modifications to the present embodiment without creative contribution as needed after reading this specification, as long as the present disclosure is used in the present invention, all new types of claims are protected by the patent law.

This embodiment relates to a dance blanket, as shown in FIG. 1, including: a blanket body 1 and a main control box 2 detachably assembled on the blanket body 1.

Figure 2:
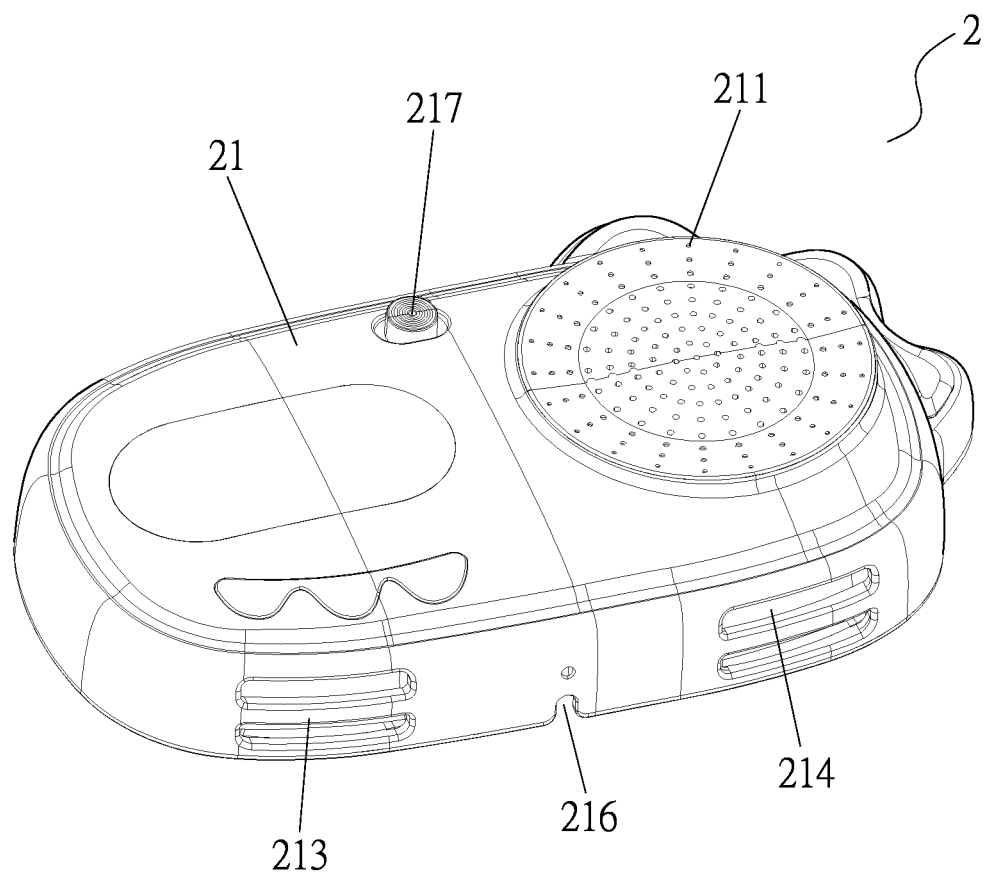
FIG. 2 is a schematic structural diagram of the main control box.
Figure 3:
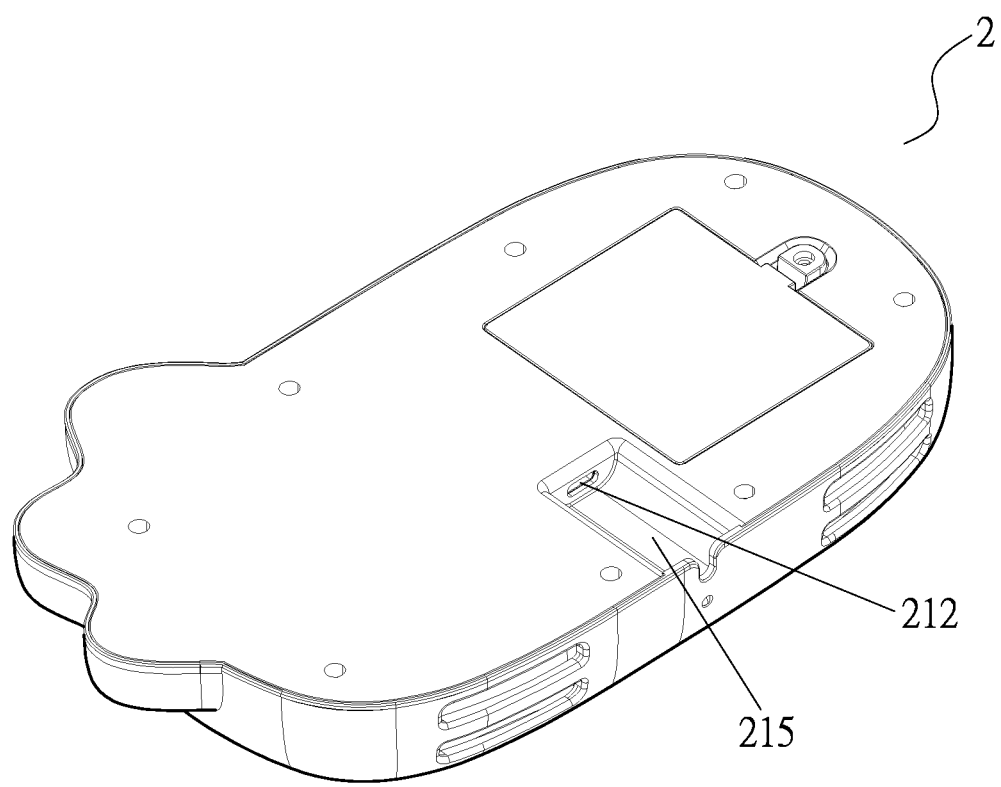
FIG. 3 is a structural schematic diagram of another perspective of the main control box.
Figure 4:
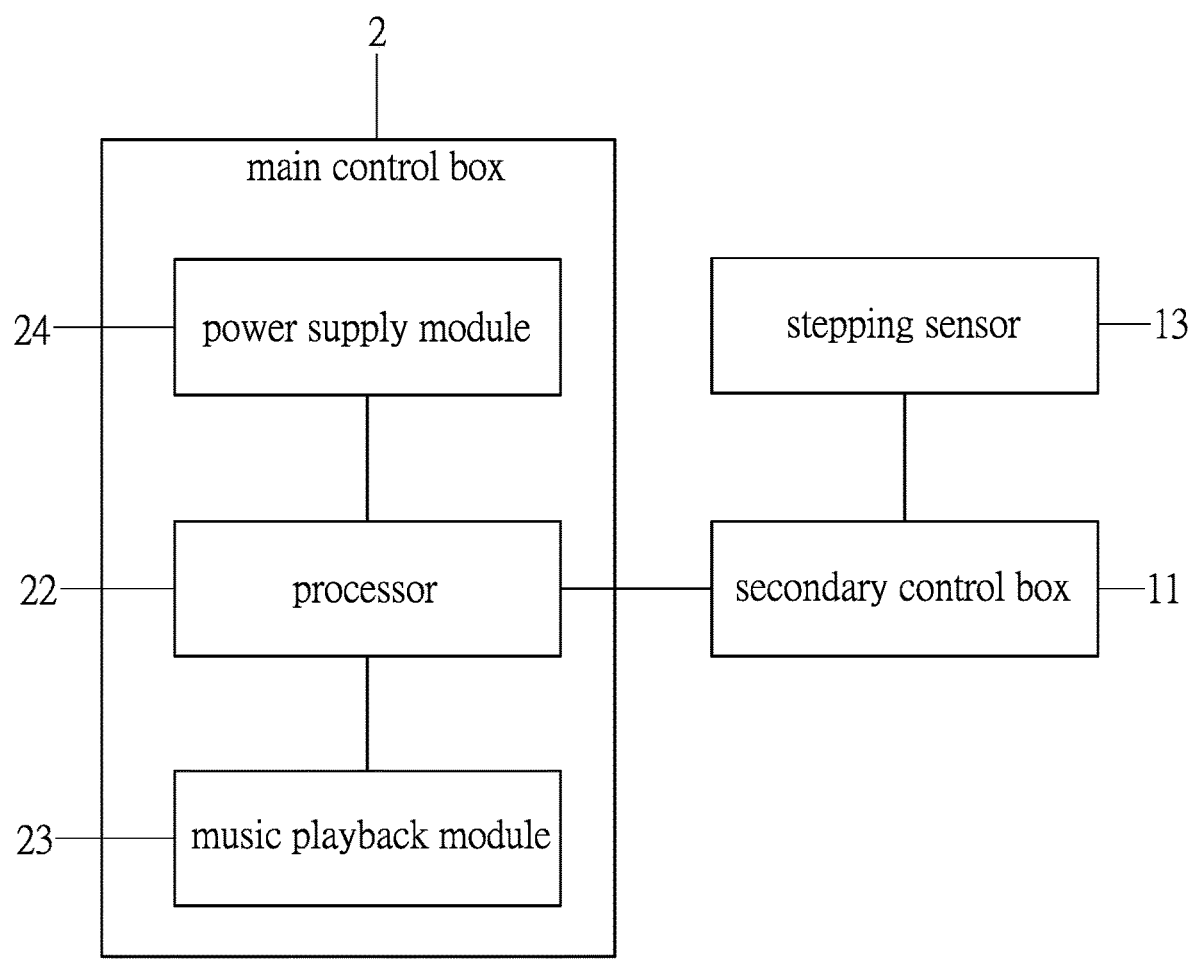
FIG. 4 is a block diagram of the modules of the present disclosure.

As shown in FIG. 2-FIG. 4, the main control box 2 includes: a housing 21, a processor 22 built in the housing 21, a music playback module 23 built into the housing 21 and electrically connected to the processor 22, a power supply module 24 built into the housing 21 and electrically connected to the processor 22, and a sound outlet hole 211 provided on the housing 21 and corresponding to an outside of the music playback module 23.

The blanket body 1 has a secondary control box 11 built into the blanket body 1. In this embodiment, the secondary control box 11 is provided with a data line, and the main control box 2 is provided with a data line interface 212. When the data line is inserted into the data line interface 212, the secondary control box 11 and the main control box 2 complete a communication connection. Of course, in other embodiments, the main control box 2 may also be provided with a data line, and the secondary control box 11 may be provided with a data line interface 212.

The main control box 2 and the blanket body 1 are designed to be detachable and separated. On the one hand, the main control box 2 can be used independently as a music player to enhance entertainment; on the other hand, it is convenient to fold the blanket body 1 after disassembly, which saves space and is more conducive to packing and carrying.

If only connected by a data line, the connection between the blanket body 1 and the main control box 2 is not stable in terms of mechanical structure. Therefore, in this embodiment, as shown in FIGS. 1 and 2, the housing 21 of the main control box 2 is provided with at least one mounting strip 213, and the blanket body 1 is provided with a hook and loop fastener 12. During assembly, one end of the hook and loop fastener 12 bypasses the mounting strip 213 and is pasted on the other end to complete self-adhesion, so as to mount the main control box 2 on the blanket body 1, and this connection method is also convenient for subsequent disassembly.

More specifically, the housing 21 is provided with at least one mounting hole 214. The mounting strip 213 is arranged in the middle of the mounting hole 214 and divides the mounting hole 214 into two halves. In this embodiment, there are two mounting holes 214, which are symmetrically arranged on the front side of the housing 21, and a mounting strip 213 is provided in the middle of each mounting hole 214. Correspondingly, the blanket body 1 is provided with two hook and loop fastener stickers 12 so as to be more stable after assembly.

In another embodiment, the main control box 2 is provided with an opening and closing opening, and the blanket body 1 is detachably assembled on the opening. In yet another embodiment, the blanket body 1 is provided with a first magnetic attraction device, and the main control box 2 is provided with a second magnetic attraction device. The blanket body 1 is detachably assembled on the main control box 2 through the cooperation of the first magnetic attraction device and the second magnetic attraction device. The above are only some specific examples of detachable mechanical connection structures, and other connection structures may also be used.

In order to prevent the data line from being exposed after the data line on the blanket body 1 is connected to the data line interface 212 of the main controller, in this embodiment, as shown in FIG. 2 and FIG. 3. the lower side of the housing 21 is provided with a data line placement slot 215 penetrating to the front side of the housing 21, and the data line interface 212 is arranged inside the data line placement slot 215. Furthermore, the front side of the housing 21 is provided with a limit slot 216 at the position corresponding to the data line placement slot 215. In this embodiment, the limit slot 216 is located in the middle of the front side of the housing 21, and the two mounting holes 214 are located on both sides thereof.

As shown in FIG. 2, the housing 21 is provided with a number of function buttons 217. When the main control box 2 is used independently, it can be operated by pressing the function button 217.

As a preferred solution, different parts of the blanket body 1 are provided with a plurality of dancing and stepping areas, and each of the plurality of dancing and stepping areas is provided with a stepping sensor 13 that is electrically connected to the secondary control box 11.

In this embodiment, the blanket body 11 is made of a flexible material, which is more convenient to fold.

The working principle of the present disclosure is roughly as follows. The main control box and the blanket body are designed to be detachable and separated. On the one hand, the main control box can be used independently as a music player to enhance entertainment; on the other hand, it is convenient to fold the blanket body after disassembly, saving space, and is more conducive to packaging and carrying.

The above is only used to illustrate the technical solution of the present disclosure and not to limit it. Other modifications or equivalent replacements made by those of ordinary skill in the art to the technical solutions of the present disclosure should be included in the scope of the claims of the present disclosure as long as they do not depart from the spirit and scope of the technical solutions of the present disclosure.

What is claimed is:

1. A dance blanket, comprising: a blanket body (1) and a main control box (2) detachably assembled on the blanket body (1), wherein the main control box (2) attaches to the blanket body with hook and loop fasteners or a magnetic fastener and the main control box is independently usable to play music when detached from the blanket body; wherein the main control box (2) comprises: a housing (21), a processor (22) built into the housing (21), a music playback module (23) built into the housing (21) and electrically connected to the processor (22), a power supply module (24) built into the housing (21) and electrically connected to the processor (22), and a sound outlet hole (211) provided on the housing (21) and corresponding to an outside of the music playback module (23); and wherein the blanket body (1) is made from a flexible material and has a secondary control box (11) built into the blanket body (1), and the secondary control box (11) is provided with a data line for connecting with a data line interface (212) on the main control box (2); or the main control box (2) is provided with a data line used for connecting to the data line interface (212) on the secondary control box (11).

2. The dance blanket according to claim 1, wherein the housing (21) is provided with a mounting strip (213), the blanket body (1) is provided with a hook and loop fastener (12), and when assembling, one end of the hook and loop fastener (12) bypasses the mounting strip (213) and is pasted on another end of the hook and loop fastener (12) to achieve self-adhesion.

3. The dance blanket according to claim 2, wherein the housing (21) is provided with at least one mounting hole (214), the mounting strip (213) is arranged in a middle of the mounting hole (214), so as to divide the mounting hole (214) into two halves.

4. The dance blanket according to claim 3, wherein a number of the mounting holes (214) is two and the two mounting holes (214) are symmetrically arranged on a front side of the housing (21), and the mounting strip (213) is provided in a middle of each of the two mounting holes (214).

5. The dance blanket according to claim 1, wherein when the data line interface (212) is arranged on the main control box (2), a lower side of the housing (21) is provided with a data line placement slot (215) that penetrates to a front side of the housing (21), and the data line interface (212) is arranged inside the data line placement slot (215).

6. The dance blanket according to claim 5, wherein a limit slot (216) is provided on a part of the front side of the housing (21) corresponding to the data line placement slot (215), and only for a line part of the data line to pass through.

7. The dance blanket according to claim 1, wherein a plurality of function buttons (217) are arranged on the housing (21).

8. The dance blanket according to claim 1, wherein the blanket body (1) is provided with a first magnetic attraction device, and the housing (21) of the main control box (2) is provided with a second magnetic attraction device, and the blanket body (1) is detachably assembled on the main control box (2) through a cooperation of the first magnetic attraction device and the second magnetic attraction device.

9. The dance blanket according to claim 1, wherein different parts of the blanket body (1) are provided with a plurality of dancing and stepping areas, and each of the plurality of dancing and stepping areas is provided with a stepping sensor (13) electrically connected to the secondary control box (11).

\* \* \* \* \*